United States Patent
Namaizawa et al.

(10) Patent No.: US 10,576,700 B2
(45) Date of Patent: Mar. 3, 2020

(54) METHOD FOR PRODUCING A FIBER-REINFORCED PLASTIC MOLDED ARTICLE

(71) Applicant: HONDA MOTOR CO., LTD., Minato-ku, Tokyo (JP)

(72) Inventors: Masaki Namaizawa, Wako (JP); Makoto Uda, Wako (JP); Hiroyuki Tanaka, Wako (JP); Hitoshi Iwadate, Wako (JP); Takuya Fujii, Wako (JP); Satoru Shinkawa, Wako (JP); Iku Koike, Wako (JP); Kazuhiro Kagawa, Wako (JP); Hirohide Azuma, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 44 days.

(21) Appl. No.: 15/831,528

(22) Filed: Dec. 5, 2017

(65) Prior Publication Data
US 2018/0169973 A1 Jun. 21, 2018

(30) Foreign Application Priority Data
Dec. 15, 2016 (JP) .................................. 2016-243079

(51) Int. Cl.
*B29C 70/46* (2006.01)
*B29C 70/54* (2006.01)
(Continued)

(52) U.S. Cl.
CPC .......... *B29C 70/467* (2013.01); *B29C 70/443* (2013.01); *B29C 70/546* (2013.01);
(Continued)

(58) Field of Classification Search
None
See application file for complete search history.

(56) References Cited

U.S. PATENT DOCUMENTS

| 4,986,948 A | * | 1/1991 | Komiya | B29C 43/3607 |
| | | | | 264/257 |
| 5,196,152 A | * | 3/1993 | Gamache | B29C 67/246 |
| | | | | 264/163 |

(Continued)

FOREIGN PATENT DOCUMENTS

| JP | 50-041970 | 4/1975 |
| JP | 56-008231 | 1/1981 |

(Continued)

*Primary Examiner* — Edmund H Lee
(74) *Attorney, Agent, or Firm* — Amin, Turocy & Watson, LLP

(57) ABSTRACT

A first continuous fiber component and a second continuous fiber component are stacked with a non-woven fabric interposed therebetween to thereby prepare a fiber base material. The fiber base material is placed between an upper mold and a lower mold. The upper mold and the lower mold are brought close to each other to thereby form an enclosed space therebetween. The enclosed space is larger in volume than a product cavity. A liquid matrix resin is supplied to the enclosed space. The upper mold and the lower mold are brought closer to each other to thereby form the product cavity in a manner that a pressing load is applied to the fiber base material. Then, the liquid matrix resin with which the fiber base material has been impregnated is hardened in the product cavity, whereby a fiber-reinforced plastic molded article is produced.

3 Claims, 9 Drawing Sheets

(51) Int. Cl.
  *B32B 5/26* (2006.01)
  *B29C 70/44* (2006.01)
  *C08J 5/04* (2006.01)
  *C08J 5/24* (2006.01)
  *B29K 307/04* (2006.01)
  *B29K 63/00* (2006.01)

(52) U.S. Cl.
  CPC ............ *B32B 5/26* (2013.01); *C08J 5/042* (2013.01); *C08J 5/043* (2013.01); *C08J 5/046* (2013.01); *B29K 2063/00* (2013.01); *B29K 2307/04* (2013.01); *B32B 2305/188* (2013.01); *B32B 2305/20* (2013.01); *B32B 2309/105* (2013.01); *C08J 5/24* (2013.01); *C08J 2363/00* (2013.01); *C08J 2375/04* (2013.01); *C08J 2377/02* (2013.01)

(56) References Cited

U.S. PATENT DOCUMENTS

| | | | | |
|---|---|---|---|---|
| 5,424,017 | A | * | 6/1995 | Hinduja ............... B29C 67/246 264/163 |
| 7,048,985 | B2 | * | 5/2006 | Mack ..................... B29C 70/24 428/105 |
| 9,011,747 | B2 | * | 4/2015 | Tateyama ............... B29C 43/18 264/257 |
| 2011/0241250 | A1 | * | 10/2011 | Horizono ............... B29C 43/36 264/258 |

FOREIGN PATENT DOCUMENTS

JP    11-058536    3/1999
JP    2013-023184    2/2013

* cited by examiner

METHOD FOR PRODUCING A FIBER-REINFORCED PLASTIC MOLDED ARTICLE

CROSS-REFERENCE TO RELATED APPLICATION

This application is based upon and claims the benefit of priority from Japanese Patent Application No. 2016-243079 filed on Dec. 15, 2016, the contents of which are incorporated herein by reference.

BACKGROUND OF THE INVENTION

Field of the Invention

The present invention relates to a fiber-reinforced plastic molded article containing a fiber base material and a matrix resin, and to a method for producing the same.

Description of the Related Art

A fiber-reinforced plastic is a composite of a fiber base material and a matrix resin, and has been known as a lightweight, high-strength, high-rigidity material. A molded article of the fiber-reinforced plastic (a fiber-reinforced plastic molded article, hereinafter referred to also as an FRP molded article) has recently been used in components of car bodies and airplanes.

For example, an FRP molded article having a so-called sandwich structure is proposed in Japanese Laid-Open Patent Publication No. 2013-023184. In this FRP molded article, a fiber base material prepared by sandwiching a core component between a pair of surface components containing a reinforcement fiber fabric is used in view of improving the flexural properties such as flexural strength and flexural rigidity. The FRP molded article can be produced by an RTM (Resin Transfer Molding) method. In the RTM method, a product cavity corresponding to a shape of a desired FRP molded article is formed in a mold, the fiber base material is shaped in the product cavity, the fiber base material is impregnated with a liquid matrix resin, and the liquid matrix resin is hardened to obtain the FRP molded article.

SUMMARY OF THE INVENTION

In a case where the FRP molded article having the sandwich structure is produced by the above RTM method, if the surface component has a low fiber volume content, a meandering portion or a portion having a non-uniform density distribution may occur in fibers of the surface component, e.g., when the core component is pressed against the surface component in the product cavity. Such a defective portion often causes bending or the like in the surface component. Therefore, in view of satisfactorily improving the flexural properties of the FRP molded article, the fiber volume content of the surface component has to be increased to prevent the generation of the defective portion.

However, in the case of using the surface component having the increased fiber volume content, it is difficult to impregnate the fiber base material with liquid matrix resin. In this case, the matrix resin may not be infiltrated into an area of the fiber base material, and the strength of the FRP molded article may be lowered due to the unimpregnated area. Although the generation of the unimpregnated area can be prevented by increasing the time for the impregnation of the fiber base material with the matrix resin, the production efficiency of the FRP molded article is significantly lowered due to the time increase.

A principal object of the present invention is to provide a fiber-reinforced plastic molded article, which can be produced without lowering the production efficiency and have improved flexural properties.

Another object of the present invention is to provide a method for producing such a fiber-reinforced plastic molded article.

According to an aspect of the present invention, there is provided a method for producing a fiber-reinforced plastic molded article containing a fiber base material and a matrix resin, including the steps of: stacking a first continuous fiber component and a second continuous fiber component with a non-woven fabric interposed therebetween to thereby prepare the fiber base material, and placing the fiber base material between an upper mold and a lower mold; bringing the upper and lower molds close to each other to thereby form an enclosed space between the upper and lower molds, the enclosed space having a volume larger than a volume of a product cavity, and supplying a liquid of the matrix resin to the enclosed space; and bringing the upper and lower molds closer to each other to thereby form the product cavity in a manner that a pressing load is applied to the fiber base material, and hardening the liquid matrix resin with which the fiber base material has been impregnated, in the product cavity.

When the pressing load is applied to the fiber base material as described above, the non-woven fabric is compressed between the first and second continuous fiber components against the elastic force of the non-woven fabric. Consequently, the first and second continuous fiber components (hereinafter referred to also as the surface components) are compressed by the pressing load from the upper and lower molds and the repelling force from the non-woven fabric, to increase the apparent fiber volume contents.

Thus, in this production method, the fiber base material is placed in the enclosed space and has a lower apparent fiber volume content since the pressing load is not yet applied to the fiber base material, and the fiber base material is then impregnated with the liquid matrix resin. Therefore, the fiber base material can be appropriately impregnated with the matrix resin, so that generation of an unimpregnated area can be prevented, and the fiber-reinforced plastic molded article with an excellent strength can be efficiently produced.

After the fiber base material is impregnated with the liquid matrix resin, the apparent fiber volume contents of the surface components can be increased by applying the pressing load to the fiber base material in the product cavity. In this state, the liquid matrix resin in the fiber base material is hardened, so that the fiber-reinforced plastic molded article having the increased fiber volume contents of the surface components can be produced. Thus, the fiber-reinforced plastic molded article can have excellent flexural properties such as flexural strength and rigidity.

Consequently, the fiber-reinforced plastic molded article production method of the present invention is capable of improving both the production efficiency and the flexural properties.

In the fiber-reinforced plastic molded article production method, when the first continuous fiber component, the non-woven fabric, and the second continuous fiber component have, respectively, thicknesses of $t1'$, $t2'$, and $t3'$ before the application of the pressing load, and the first continuous fiber component, the non-woven fabric, and the second continuous fiber component have, respectively, thicknesses of $t1$, $t2$, and $t3$ during the application of the pressing load, preferably relationships of $t2/t1 < t2'/t1'$ and $t2/t3 < t2'/t3'$ are satisfied.

In this case, the thickness ratio of the non-woven fabric to the first continuous fiber component in the fiber base material before the application of the pressing load is larger than the thickness ratio of the non-woven fabric to the first continuous fiber component in the fiber base material during the application of the pressing load. Similarly, the thickness ratio of the non-woven fabric to the second continuous fiber component in the fiber base material before the application of the pressing load is larger than the thickness ratio of the non-woven fabric to the second continuous fiber component in the fiber base material during the application of the pressing load.

Thus, the thickness change of the non-woven fabric due to the pressing load application is set to be larger than each of the thickness changes of the first and second continuous fiber components due to the pressing load application. Therefore, during the pressing load application to the fiber base material, the repelling force from the non-woven fabric can be effectively applied to the surface components to thereby increase the fiber volume contents of the surface components. Consequently, the production method can provide a more excellent effect of efficiently producing the fiber-reinforced plastic molded article with the improved flexural properties.

In the fiber-reinforced plastic molded article production method, it is preferred that relationships of $t2'/t1'=3$ to 20, $t2'/t3'=3$ to 20, $t2/t1=2$ to 10, and $t2/t3=2$ to 10 are satisfied. In this case, both of the flexural properties and the production efficiency of the fiber-reinforced plastic molded article can be further improved. The produced fiber-reinforced plastic molded article is particularly suitable for use in components of car bodies.

In the fiber-reinforced plastic molded article production method, it is preferred that the first continuous fiber component, the non-woven fabric, and the second continuous fiber component after the stacking are integrated by needle punching to thereby prepare the fiber base material. In this case, fiber pieces oriented in the thickness direction can be located at the boundary between the surface components and the non-woven fabric, so that the surface components can be hardly peeled off from the non-woven fabric because of their anchor effect or the like. Furthermore, the fiber pieces oriented in the thickness direction can act to form a flow path for the liquid matrix resin, so that the fiber base material can be readily impregnated with the liquid matrix resin, and the generation of the unimpregnated area can be prevented.

As a result, even when a flexural load is applied to the fiber-reinforced plastic molded article, the surface components can be prevented from peeling off from the non-woven fabric, and thereby the flexural strength can be improved further effectively. Furthermore, the fiber base material can be appropriately impregnated with the matrix resin, whereby the production efficiency and the strength of the fiber-reinforced plastic molded article can be improved more effectively.

According to another aspect of the present invention, there is provided a fiber-reinforced plastic molded article including a fiber base material and a matrix resin, wherein the fiber base material contains a first continuous fiber component, a second continuous fiber component, and a non-woven fabric interposed between the first and second continuous fiber components. When the first continuous fiber component has a thickness of t1 and a fiber volume content of Vf1, the non-woven fabric has a thickness of t2 and a fiber volume content of Vf2, and the second continuous fiber component has a thickness of t3 and a fiber volume content of Vf3, relationships of $Vf1>Vf2$, $t1<t2$, $Vf3>Vf2$, and $t3<t2$ are satisfied.

In the fiber-reinforced plastic molded article of the present invention, the surface components have fiber volume contents higher than a fiber volume content of the non-woven fabric, and thicknesses smaller than a thickness of the non-woven fabric as described above. Thus, even in the case of using a smaller amount of the fiber than conventional fiber-reinforced plastic molded articles that contain only continuous fiber components, the fiber-reinforced plastic molded article of the present invention can exhibit flexural properties equivalent to the conventional fiber-reinforced plastic molded articles.

In the fiber-reinforced plastic molded article, it is preferred that in the non-woven fabric, a center portion has a fiber volume content lower than fiber volume contents of both end portions in the thickness direction. In this case, in the thickness direction of the fiber base material, the fiber volume content is higher in the surface portion than in the center portion. Therefore, the flexural rigidity of the fiber-reinforced plastic molded article can be improved further effectively.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

A preferred embodiment of a fiber-reinforced plastic molded article (an FRP molded article) and a related production method according to the present invention will be described in detail below with reference to the accompanying drawings.

Figure 1:
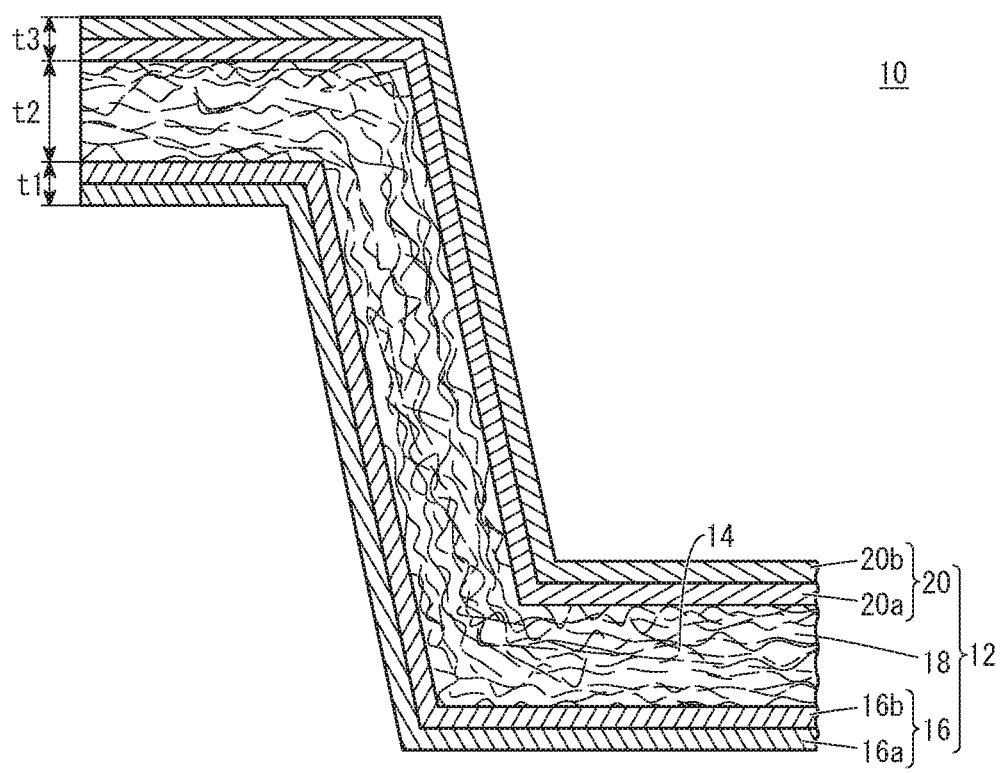
FIG. 1 is a schematic vertical cross-sectional view of a fiber-reinforced plastic molded article according to an embodiment of the present invention.

FIG. 1 is a schematic vertical cross-sectional view of a fiber-reinforced plastic molded article 10 according to this embodiment. The fiber-reinforced plastic molded article 10 contains a fiber base material 12, and a matrix resin 14 composited with the fiber base material 12 (see FIG. 4). The fiber base material 12 contains a first continuous fiber component 16, a non-woven fabric 18, and a second continuous fiber component 20, which are stacked in this order and are integrated by needle punching as described later. Therefore, fiber pieces oriented in the thickness direction of the fiber base material 12 are formed between the first continuous fiber component 16 and the non-woven fabric 18 and between the second continuous fiber component 20 and the non-woven fabric 18. The first continuous fiber component 16 and the second continuous fiber component 20 are hereinafter referred to also as the surface components 16, 20.

For example, the first continuous fiber component 16 is formed by preparing UD (unidirectional) material sheets 16a, 16b containing reinforcement fiber pieces oriented in one direction, and then stacking the UD material sheets 16a, 16b in such a manner that the orientation direction of the reinforcement fiber pieces in the UD material sheet 16a is different from that in the other UD material sheet 16b. The number of the UD material sheets in the first continuous fiber component 16 is not limited to two, and may be only one and may be three or more. The UD material sheets 16a, 16b may be stacked in such a manner that the orientation direction of the reinforcement fiber pieces in the UD material sheet 16a is equal to that in the other UD material sheet 16b. Preferred materials for the reinforcement fiber pieces include carbon fibers, glass fibers, resin fibers, and the like.

The non-woven fabric 18 is formed in a sheet shape from reinforcement fiber pieces in such a manner that the sheet has an elasticity in the thickness direction. Preferred materials for the reinforcement fiber pieces in the non-woven fabric 18 are equal to those for the reinforcement fiber pieces in the first continuous fiber component 16. In the non-woven fabric 18, the fiber volume content is adjusted to be lower in a center portion than in both end portions in the thickness direction.

The second continuous fiber component 20 may have various structures as well as the first continuous fiber component 16. In this embodiment, the second continuous fiber component 20 is formed by preparing UD material sheets 20a, 20b containing reinforcement fiber pieces oriented in one direction, and then stacking the UD material sheets 20a, 20b in such a manner that the orientation direction of the reinforcement fiber pieces in the UD material sheet 20a is different from that in the other UD material sheet 20b.

The fiber base material 12 is composited with the matrix resin 14 to produce the fiber-reinforced plastic molded article 10. The surface components 16, 20 and the non-woven fabric 18 are compressed in the thickness direction, and are maintained in the compressed states. In the fiber-reinforced plastic molded article 10, when the first continuous fiber component 16 has a thickness (a total thickness of the UD material sheets 16a, 16b) of t1 and a fiber volume content of Vf1, the non-woven fabric 18 has a thickness of t2 and a fiber volume content of Vf2, and the second continuous fiber component 20 has a thickness (a total thickness of the UD material sheets 20a, 20b) of t3 and a fiber volume content of Vf3, the components satisfy the relationships of Vf1>Vf2, t1<t2, Vf3>Vf2, and t3<t2.

Figure 2:
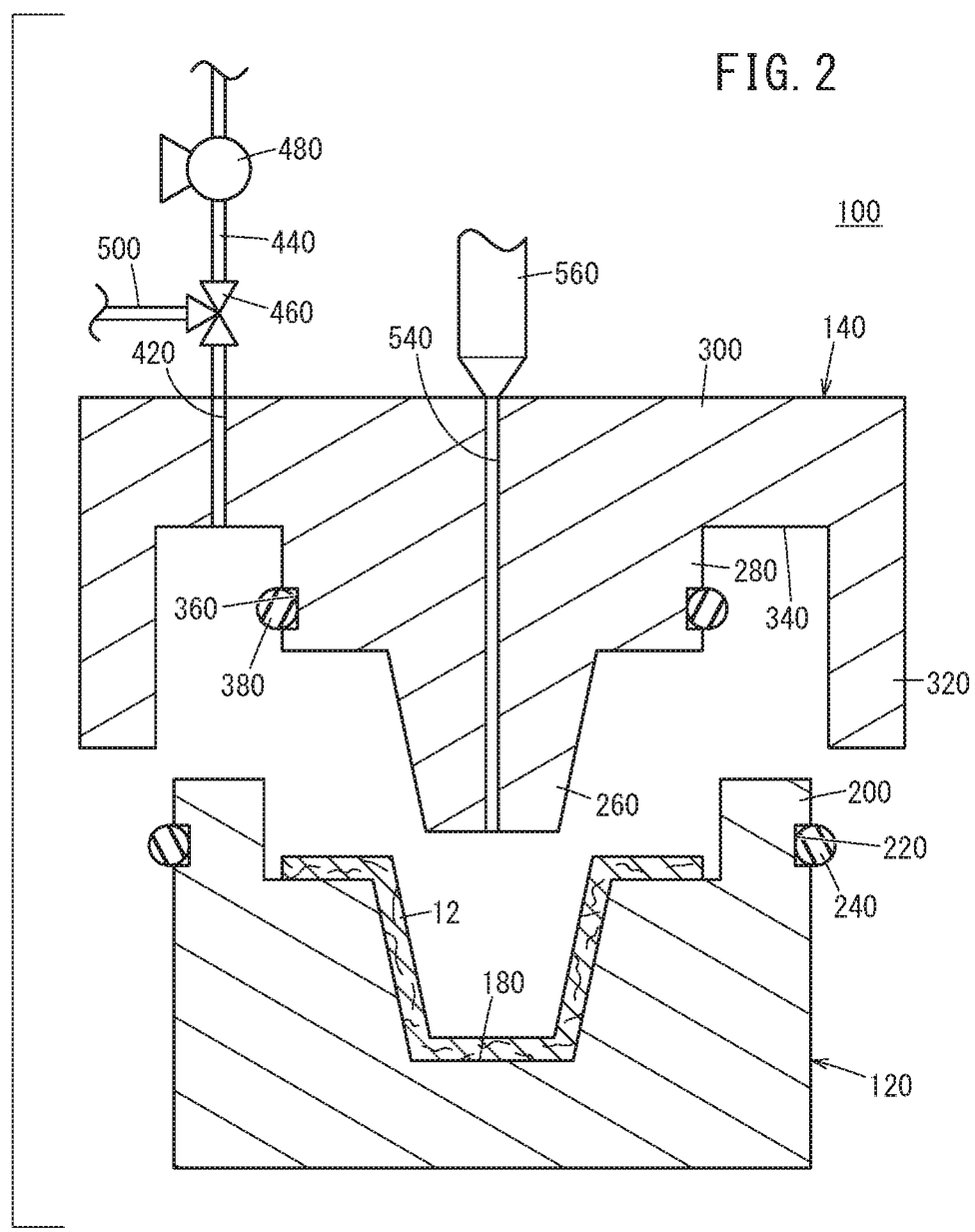
FIG. 2 is a schematic vertical cross-sectional view of a molding apparatus for producing the fiber-reinforced plastic molded article of FIG. 1 being in an open state.

FIG. 2 is a schematic vertical cross-sectional view of a molding apparatus 100 for producing the fiber-reinforced plastic molded article 10. The molding apparatus 100 has a lower mold 120 and an upper mold 140 for shape forming. A product cavity 160 having a shape corresponding to the fiber-reinforced plastic molded article 10 (see FIG. 7) and an enclosed space 170 larger in volume than the product cavity 160 (see FIGS. 4 and 6) can be formed between the lower mold 120 and the upper mold 140. Incidentally, in FIG. 2, the molding apparatus 100 is in an open state.

The lower mold 120 is a stationary mold located and fixed in a predetermined position, and is a so-called female mold having a vertically extending cavity forming depression 180. On the edge of the upper surface of the lower mold 120, a protruding portion 200 projecting toward the upper mold 140 is formed around the cavity forming depression 180.

A first groove 220 is circumferentially formed in an outer side surface of the protruding portion 200. A first sealing member 240 is inserted into the first groove 220. A large part of the first sealing member 240 protrudes from the first groove 220.

On the other hand, the upper mold 140 is a movable mold, which can be lowered and raised (moved closer to and away from the lower mold 120) by an elevating mechanism (not shown). The upper mold 140 is a so-called male mold having a cavity forming protrusion 260, and the cavity forming protrusion 260 enters the cavity forming depression 180 when the molds are closed. As the cavity forming protrusion 260 enters the cavity forming depression 180, the enclosed space 170 and the product cavity 160 are formed.

The upper mold 140 further has a columnar portion 280 and a base portion 300. The cavity forming protrusion 260 is connected through the columnar portion 280 to the base portion 300.

A surrounding wall 320 extending toward the lower mold 120 is formed on the edge of the lower surface of the base portion 300. The outer side surface of the protruding portion 200 is surrounded by the surrounding wall 320 in the closed state. Therefore, a relatively depressed insertion portion 340 is formed between the columnar portion 280 and the surrounding wall 320. Thus, the insertion portion 340 is formed by the side surface of the columnar portion 280, the lower surface of the base portion 300, and the inner side surface of the surrounding wall 320.

A second groove 360 is circumferentially formed in the side surface of the columnar portion 280 (i.e. on the insertion portion 340). A second sealing member 380 is inserted into the second groove 360. A large part of the second sealing member 380 protrudes from the second groove 360 in the same manner as the first sealing member 240.

The protruding portion 200 is inserted into the insertion portion 340 as described later. Then, the first sealing member 240 is brought into abutment against the inner side surface of the surrounding wall 320, and the second sealing member 380 is brought into abutment against the inner side surface of the protruding portion 200 (see FIG. 4). As a result, a sealed chamber 400 is formed between the first sealing member 240 and the second sealing member 380.

The base portion 300 has a discharge passage 420 communicating with the sealed chamber 400. The discharge passage 420 is connected with a discharge tube 440, and a three-way valve 460 and a pump 480 are arranged on the discharge tube 440 in this order from the upstream side (from the discharge passage 420).

The three-way valve 460 is further connected with an atmosphere-open tube 500 opened to the atmospheric air. Thus, the three-way valve 460 acts to switch between a flow path toward the pump 480 and a flow path open to the atmospheric air. When the flow path toward the pump 480 is selected, a gas in inner space of the lower mold 120 and the upper mold 140 is discharged by the pump 480. On the other hand, when the flow path communicating with the atmospheric air is selected, the inner space of the lower mold 120 and the upper mold 140 is made open to the atmospheric air. Incidentally, one of the three ports in the three-way valve 460 may be directly opened to the atmospheric air without the atmosphere-open tube 500 connected thereto.

The upper mold 140 has a runner 540 extending from the base portion 300 through the columnar portion 280 to the cavity forming protrusion 260. The runner 540 is a supply channel for supplying a liquid of the matrix resin 14 (see FIG. 4) from an injector 560 to the enclosed space 170.

A method, using the molding apparatus 100, for producing the fiber-reinforced plastic molded article 10 according to this embodiment will be described below.

Figure 5:
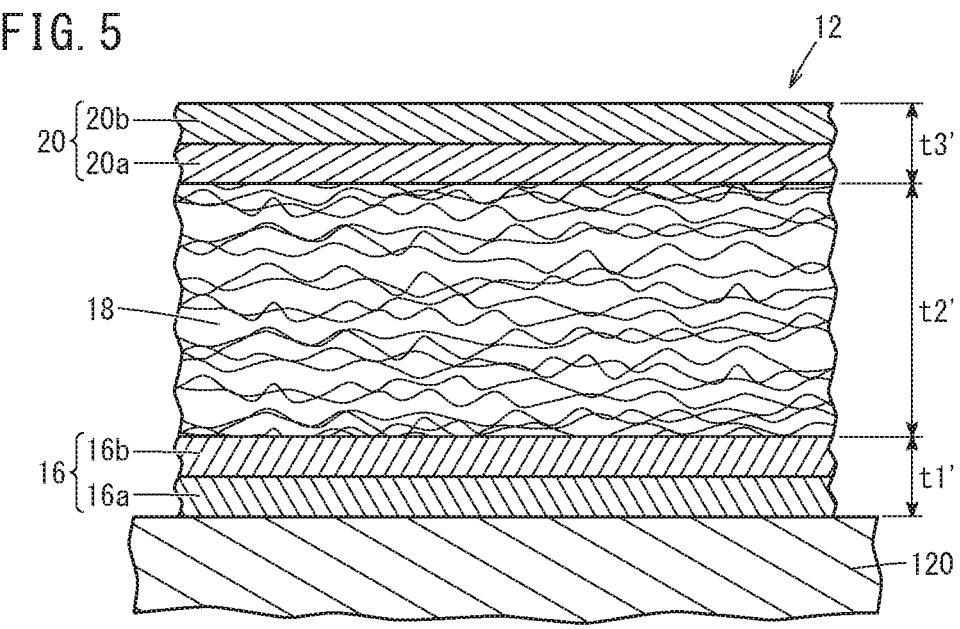
FIG. 5 is a schematic enlarged view of the molding apparatus of FIG. 4.

First, the first continuous fiber component 16, the non-woven fabric 18, and the second continuous fiber component 20 are stacked in this order, and are integrated by inserting a needle (not shown) in the thickness direction in a needle punching process, to thereby prepare the fiber base material 12. At this stage, the fiber base material 12 is not yet composited with the matrix resin 14. In other words, each of the surface components 16, 20 and the non-woven fabric 18 is not yet compressed in the thickness direction. When the first continuous fiber component 16 has a thickness of t1', the non-woven fabric 18 has a thickness of t2', and the second continuous fiber component 20 has a thickness of t3' in the fiber base material 12 before the compression (before the application of a pressing load) (see FIG. 5), the thicknesses satisfy the relationships of t1'>t1, t2'>t2, and t3'>t3.

As shown in FIG. 2, the molding apparatus 100 is placed in the open state, and the fiber base material 12 is placed in the cavity forming depression 180. In this step, the lower mold 120 and the upper mold 140 are separated away from each other, and the space between the lower mold 120 and the upper mold 140 is opened to the atmospheric air. The three-way valve 460 is in the closed state.

Figure 3:
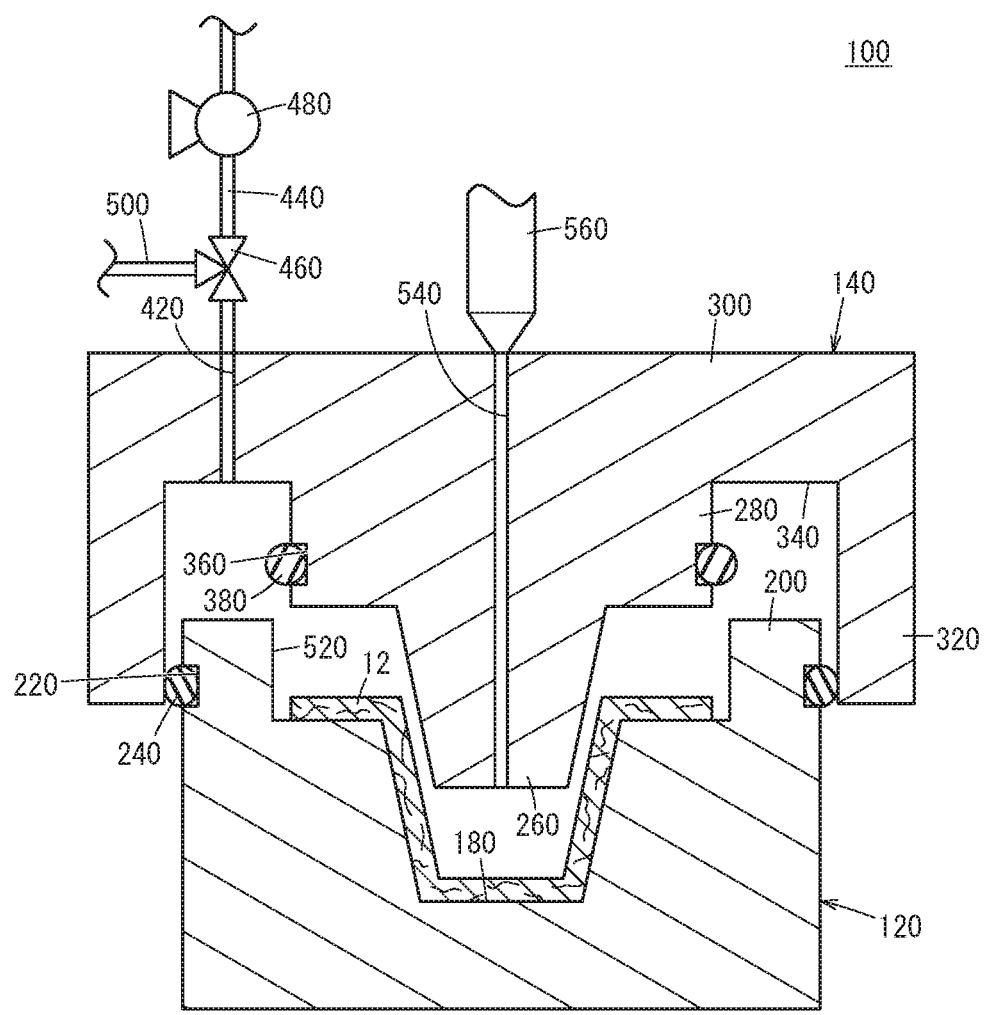
FIG. 3 is a schematic vertical cross-sectional view of the molding apparatus in the middle of changing from the open state of FIG. 2 to a closed state.

Next, the elevating mechanism is driven to lower the upper mold 140 toward the lower mold 120. In the process of lowering, the inner side surface of the surrounding wall 320 in the upper mold 140 faces the outer side surface of the protruding portion 200 in the lower mold 120. As shown in FIG. 3, when the inner side surface of the surrounding wall 320 is brought into contact with the first sealing member 240, the gap between the protruding portion 200 and the surrounding wall 320 is sealed by the first sealing member 240. As a result, a space 520, shielded from the atmospheric air, is formed between the lower mold 120 and the upper mold 140.

Then, the pump 480 is driven, and the three-way valve 460 is operated to open the flow path toward the pump 480. Thus, the discharge tube 440 is connected with the space between the lower mold 120 and the upper mold 140, so that the air in the space 520 is discharged by the pump 480. Consequently, the inner pressure of the space 520 is reduced to a negative pressure of about 50 to 100 kPa.

Figure 4:
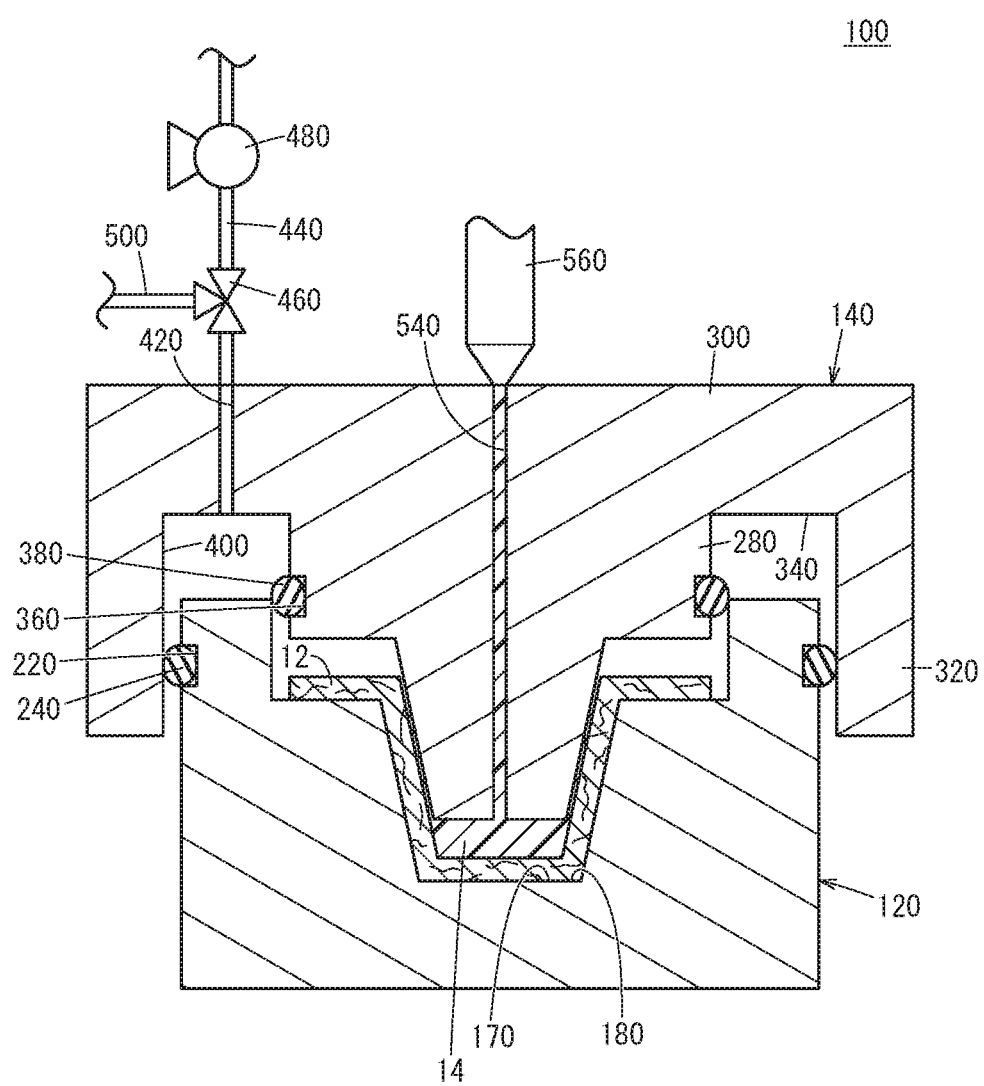
FIG. 4 is a schematic vertical cross-sectional view of the molding apparatus coming closer to the closed state from the state of FIG. 3.

The upper mold 140 is continuously lowered also during the discharge of the air in the space 520. Therefore, as shown in FIG. 4, the cavity forming protrusion 260 enters the cavity forming depression 180, and is moved closer to the fiber base material 12. In addition, the protruding portion 200 is moved closer to the insertion portion 340, and the inner side surface of the protruding portion 200 faces the side surface of the columnar portion 280. Thus, the molding apparatus 100 comes closer to the closed state.

When the inner side surface of the protruding portion 200 is brought into contact with the second sealing member 380, the gap between the protruding portion 200 and the columnar portion 280 is sealed by the second sealing member 380. As a result, the enclosed space 170, which is larger in volume than the product cavity 160 (see FIG. 7), is formed between the lower mold 120 and the upper mold 140. In the enclosed space 170, the upper mold 140 is not in contact with the fiber base material 12. In other words, the pressing load is not applied to the fiber base material 12. Therefore, as shown in the schematic enlarged view of FIG. 5, the surface components 16, 20 and the non-woven fabric 18 in the fiber base material 12 are not yet compressed in the thickness direction.

The gap between the protruding portion 200 and the surrounding wall 320 is maintained in the sealed state by the first sealing member 240. Therefore, the sealed chamber 400 is formed between the first sealing member 240 and the second sealing member 380. The sealed chamber 400 is isolated from the enclosed space 170 by the second sealing member 380.

At this point, the three-way valve 460 is closed, and the pump 480 is de-actuated to stop the discharge. The time to stop the discharged may be determined in the following manner. That is, the time point of the formation of the sealed chamber 400 is calculated in advance from the installing positions of the first sealing member 240 and the second sealing member 380 and the lowering speed of the upper mold 140, and the time to stop the discharge is determined based on the calculated time point.

Then, the liquid of the matrix resin 14 is supplied from the injector 560. Preferred examples of the liquid matrix resin 14 include epoxy resins, urethane resins, and polyamide resins (such as ε-caprolactam resins). In the case of using the ε-caprolactam resin, a catalyst or an activator may be supplied simultaneously. Examples of the catalysts include alkali metals such as sodium, alkaline-earth metals, and oxides, hydroxides, and hydrides thereof. Examples of the activators include isocyanates, acyl-lactams, isocyanurate derivatives, acid halides, and carbamide lactams.

In the case of using the epoxy resin, a hardener may be supplied simultaneously. Examples of the hardeners include acid anhydrides, aliphatic polyamines, amidoamines, polyamides, Lewis bases, and aromatic polyamines.

The liquid matrix resin 14 is moved through the runner 540, and then injected from the distal end of the cavity forming protrusion 260 into the enclosed space 170. The liquid matrix resin 14 is injected under a predetermined pressure from the injector 560, and flows relatively readily through a gap between the fiber base material 12 and the cavity forming protrusion 260. When the amount of the injected matrix resin 14 reaches a predetermined amount, the injection is stopped.

Before, after, or at the same time as the injection stop, the three-way valve 460 is operated to open the flow path that is open to the atmospheric air. Thus, the atmosphere-open tube 500 is brought into communication with the sealed chamber 400, so that the sealed chamber 400 is made open to the atmospheric air. Consequently, the inner pressure of the sealed chamber 400 is increased to the atmospheric pressure.

Figure 6:
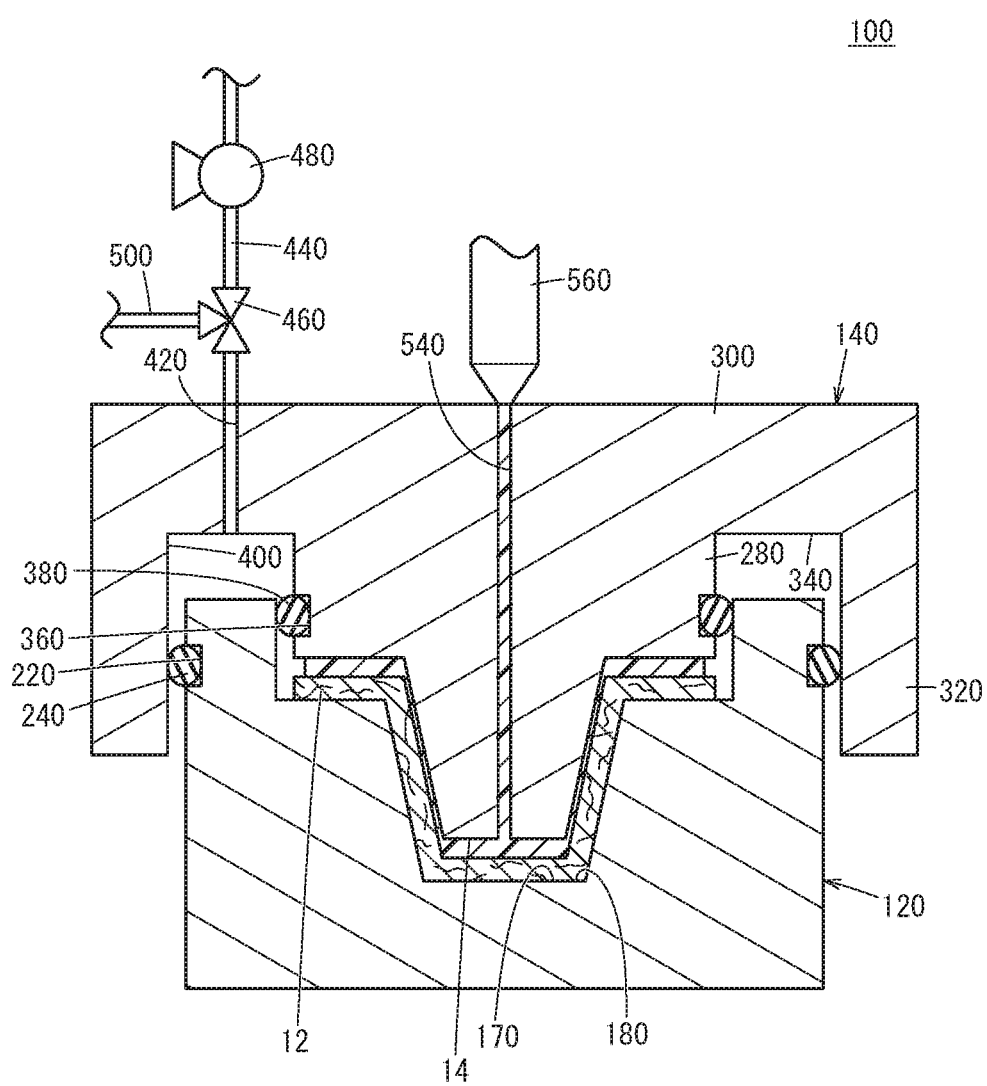
FIG. 6 is a schematic vertical cross-sectional view of the molding apparatus coming closer to the closed state from the state of FIG. 4.

When the upper mold 140 is further lowered and the cavity forming protrusion 260 further enters the cavity forming depression 180 as shown in FIG. 6, the liquid matrix resin 14 is pressed by the cavity forming protrusion 260. Also in this step, the upper mold 140 is not yet in contact with the fiber base material 12, and accordingly the pressing load is not yet applied to the fiber base material 12 in the enclosed space 170. Thus, also at this stage, the fiber base material 12 is not yet compressed, so that an increase in the apparent fiber volume content, as described hereinafter, is not achieved.

Since the fiber base material 12 is not compressed in the thickness direction, the liquid matrix resin 14 is pressed by the cavity forming protrusion 260 (the upper mold 140), and the enclosed space 170 is under the negative pressure, the liquid matrix resin 14 can be readily spread along the fiber base material 12. Consequently, the fiber base material 12 can be impregnated appropriately with the liquid matrix resin 14.

Figure 7:
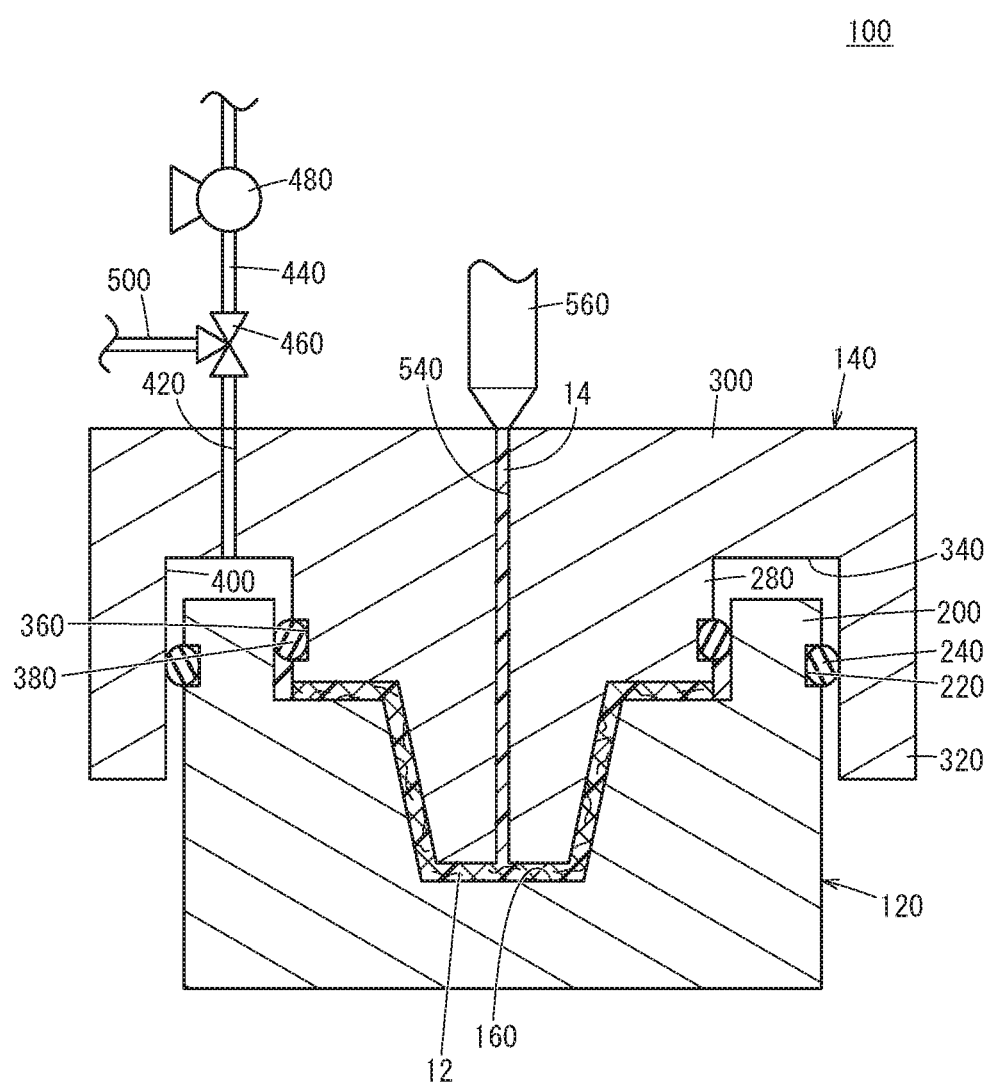
FIG. 7 is a schematic vertical cross-sectional view of the molding apparatus reaching the closed state after the state of FIG. 6.

Then, as shown in FIG. 7, the upper mold 140 is further lowered to thereby form the product cavity 160 between the lower mold 120 and the upper mold 140. Therefore, the pressing load is applied to the fiber base material 12 in the product cavity 160, and the fiber base material 12 is compressed in the thickness direction. Thus, the non-woven fabric 18 is compressed between the first continuous fiber component 16 and the second continuous fiber component 20 against the elastic force of the non-woven fabric 18. Consequently, the surface components 16, 20 are compressed by the pressing load from the upper mold 140 and the lower mold 120, and the repelling force from the non-woven fabric 18, to thereby increase the apparent fiber volume contents effectively.

Figure 8:
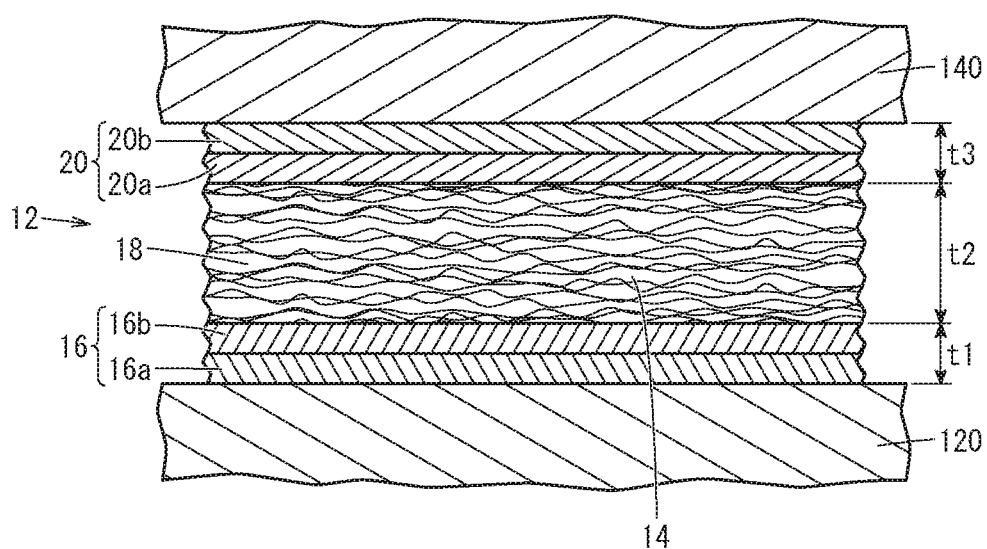
FIG. 8 is a schematic enlarged view of the molding apparatus of FIG. 7.

Specifically, as shown in the schematic enlarged view of FIG. 8, the thickness of the first continuous fiber component 16 is reduced to t1, and the apparent fiber volume content is increased to Vf1. Furthermore, the thickness of the non-woven fabric 18 is reduced to t2, and the apparent fiber volume content is increased to Vf2. Furthermore, the thickness of the second continuous fiber component 20 is reduced to t3, and the apparent fiber volume content is increased to Vf3.

It is preferred that the thicknesses of the fiber base material 12 before and during the application of the pressing load satisfy the relationships of t2/t1<t2'/t1' and t2/t3<t2'/t3'. It is further preferred that the thicknesses satisfy the relationships of t2'/t1'=3 to 20, t2'/t3'=3 to 20, t2/t1=2 to 10, and t2/t3=2 to 10.

The liquid matrix resin 14 in the product cavity 160 is hardened in a predetermined time, whereby the fiber-reinforced plastic molded article 10 is produced. In the fiber-reinforced plastic molded article 10, the thicknesses and fiber volume contents of the surface components 16, 20 and non-woven fabric 18 after the compression are maintained.

Figure 9:
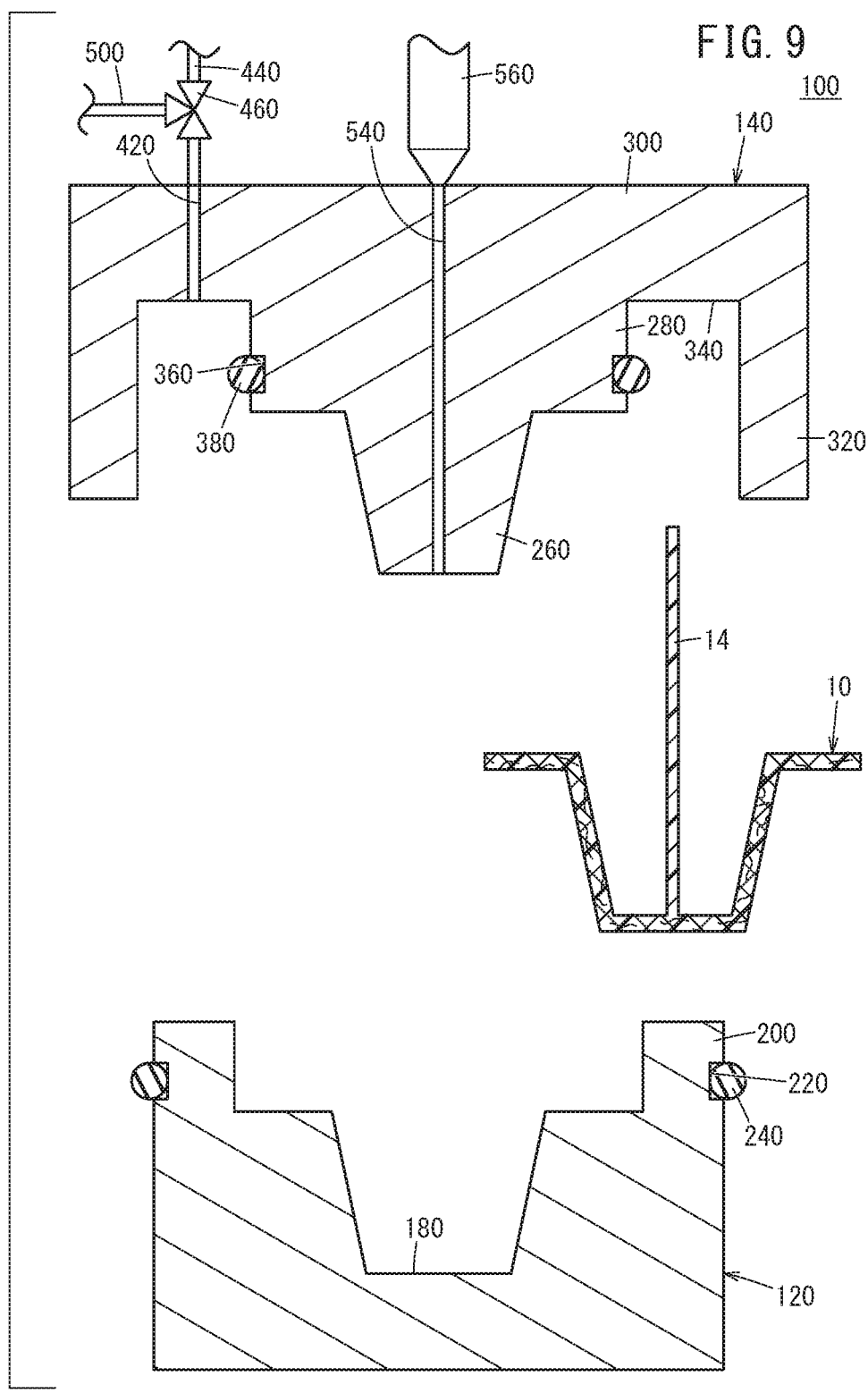
FIG. 9 is a schematic vertical cross-sectional view of the molding apparatus in which molds are opened after the state of FIG. 7 and then the fiber-reinforced plastic molded article is released from the molds.

Thereafter, as shown in FIG. 9, the upper mold 140 is raised by the elevating mechanism, whereby the molding apparatus 100 is returned to the opened state. Then, the fiber-reinforced plastic molded article 10 is released from the molding apparatus 100. Thus, a so-called demolding is carried out. For example, an ejector pin (not shown) or the like may be used in this step.

As described above, in the production method of this embodiment, the fiber base material 12, which has a relatively low apparent fiber volume content since the pressing load is not yet applied, is placed in the enclosed space 170 and is impregnated with the liquid matrix resin 14. Therefore, the fiber base material 12 can be appropriately impregnated with the matrix resin 14, whereby generation of an unimpregnated area can be prevented, and the fiber-reinforced plastic molded article 10 can be efficiently produced with an excellent strength.

The apparent fiber volume contents of the surface components 16, 20 after impregnation with the liquid matrix resin 14 can be increased by applying the pressing load to the fiber base material 12 in the product cavity 160. Since the liquid matrix resin 14 in the fiber base material 12 is hardened in this state, the obtained fiber-reinforced plastic molded article 10 can have the increased fiber volume contents in the surface components 16, 20. Consequently, the resultant fiber-reinforced plastic molded article 10 can exhibit improved flexural properties such as flexural strength and flexural rigidity.

Thus, in this production method, both of the production efficiency and flexural properties of the fiber-reinforced plastic molded article 10 can be improved.

This production method satisfies the above relationships between the thickness of the fiber base material 12 before the pressing load application and the thickness of the fiber base material 12 during the pressing load application. The thickness change of the non-woven fabric 18 due to the pressing load application is set to be larger than the thickness changes of the first continuous fiber component 16 and the second continuous fiber component 20 due to the pressing load application. Therefore, when the pressing load is applied to the fiber base material 12, the repelling force from the non-woven fabric 18 can be effectively applied to the surface components 16, 20 to thereby increase the fiber volume contents of the surface components 16, 20. Consequently, the production method can provide a more excellent effect of efficiently producing the fiber-reinforced plastic molded article 10 with the improved flexural properties.

In the production method, the fiber base material 12 is prepared by the needle punching process, and thus the fiber pieces oriented in the thickness direction are disposed between the surface components 16, 20 and the non-woven fabric 18 as described above. Consequently, the surface components 16, 20 can be hardly peeled off from the non-woven fabric 18 because of their anchor effect or the like. In addition, the fiber pieces oriented in the thickness direction can act to form a flow path for the liquid matrix resin 14. Therefore, the fiber base material 12 can be readily impregnated with the liquid matrix resin 14, and the generation of the unimpregnated area can be prevented.

As a result, even when a flexural load is applied to the fiber-reinforced plastic molded article 10, the surface components 16, 20 can be prevented from peeling off from the non-woven fabric 18, and thereby the flexural strength can be improved further effectively. Furthermore, since the matrix resin 14 can be appropriately infiltrated into the fiber base material 12, the production efficiency and the strength of the fiber-reinforced plastic molded article 10 can be further improved more effectively.

The fiber-reinforced plastic molded article 10 contains the surface components 16, 20, which have the fiber volume contents higher than the fiber volume content of the non-woven fabric 18 and the thicknesses smaller than thickness of the non-woven fabric 18, as described above. Therefore, even in the case of using a smaller amount of the fiber than conventional fiber-reinforced plastic molded articles that contain only continuous fiber components (not shown), the fiber-reinforced plastic molded article 10 can exhibit flexural properties equivalent to the conventional fiber-reinforced plastic molded articles. In addition, as described above, in the non-woven fabric 18 of the fiber-reinforced plastic molded article 10, the center portion has a fiber volume content lower than fiber volume contents of both end portions in the thickness direction. In this case, in the thickness direction of the fiber base material 12, the fiber volume content is higher in the surface portion than in the center portion. Consequently, the flexural rigidity of the fiber-reinforced plastic molded article 10 can be improved further effectively.

The present invention is not particularly limited to the above embodiment. Various changes and modifications may be made to the embodiment without departing from the scope of the invention.

What is claimed is:

1. A method for producing a fiber-reinforced plastic molded article containing a fiber base material and a matrix resin, comprising the steps of:
   stacking a first continuous fiber component and a second continuous fiber component with a non-woven fabric interposed therebetween to thereby prepare the fiber base material, and placing the fiber base material between an upper mold and a lower mold;
   bringing the upper mold and the lower mold close to each other to thereby form an enclosed space between the upper mold and the lower mold, the enclosed space having a volume larger than a volume of a product cavity, and supplying a liquid of the matrix resin to the enclosed space to thereby impregnate the fiber base material with the matrix resin; and
   bringing the upper mold and the lower mold closer to each other to thereby form the product cavity in a manner that a pressing load is applied to the fiber base material, pressing the fiber base material in a manner that a fiber volume content of the fiber base material becomes larger compared to that during impregnation with the matrix resin, and hardening the liquid of the matrix resin present within the fiber base material in a state where a thickness of the fiber base material is reduced compared to that during impregnation with the matrix resin, wherein
   when the first continuous fiber component, the non-woven fabric, and the second continuous fiber component have, respectively, thicknesses of $t1'$, $t2'$, and $t3'$ before application of the pressing load, and
   the first continuous fiber component, the non-woven fabric, and the second continuous fiber component have, respectively, thicknesses of $t1$, $t2$, and $t3$ during the application of the pressing load,
   relationships of $t2/t1 < t2'/t1'$ and $t2/t3 < t2'/t3'$ are satisfied.

2. The method according to claim 1, wherein
   relationships of $t2'/t1' = 3$ to $20$, $t2'/t3' = 3$ to $20$, $t2/t1 = 2$ to $10$, and $t2/t3 = 2$ to $10$ are satisfied.

3. The method according to claim 1, wherein
   the first continuous fiber component, the non-woven fabric, and the second continuous fiber component after the stacking are integrated by needle punching to thereby prepare the fiber base material.

* * * * *